United States Patent
Ahmed et al.

(10) Patent No.: US 12,265,608 B2
(45) Date of Patent: Apr. 1, 2025

(54) STACK PROTECTION

(71) Applicant: THALES DIS FRANCE SAS, Meudon (FR)

(72) Inventors: Naveed Ahmed, Singapore (SG); Prasanna Hegde, Singapore (SG)

(73) Assignee: THALES DIS FRANCE SAS, Meudon (FR)

( * ) Notice: Subject to any disclaimer, the term of this patent is extended or adjusted under 35 U.S.C. 154(b) by 193 days.

(21) Appl. No.: 17/928,995

(22) PCT Filed: Jun. 1, 2021

(86) PCT No.: PCT/EP2021/064698
§ 371 (c)(1),
(2) Date: Dec. 1, 2022

(87) PCT Pub. No.: WO2021/245094
PCT Pub. Date: Dec. 9, 2021

(65) Prior Publication Data
US 2023/0222213 A1    Jul. 13, 2023

(30) Foreign Application Priority Data
Jun. 2, 2020 (EP) .................................... 20315293

(51) Int. Cl.
*G06F 21/54* (2013.01)
*G06F 21/55* (2013.01)

(52) U.S. Cl.
CPC ............ *G06F 21/54* (2013.01); *G06F 21/554* (2013.01); *G06F 2221/033* (2013.01)

(58) Field of Classification Search
CPC .. G06F 21/54; G06F 21/554; G06F 2221/033; G06F 21/52
See application file for complete search history.

(56) References Cited

U.S. PATENT DOCUMENTS 7,546,587 B2 * 6/2009 Marr ....................... G06F 21/10
                                                       717/124
10,037,212 B2 * 7/2018 Porosanu .................. G06F 9/06
(Continued)

FOREIGN PATENT DOCUMENTS

EP      3040895 A1    7/2016

OTHER PUBLICATIONS

International Search Report (PCT/ISA/210) and Written Opinion (PCT/ISA/237) mailed on Sep. 9, 2021 by the European Patent Office as the International Searching Authority for International Application No. PCT/EP2021/064698 [14 pages].

(Continued)

*Primary Examiner* — Mohammed Waliullah

(57) ABSTRACT

The present invention relates to a method for protecting a program in a computer system, the method comprising:
when a subroutine of said program is called, pushing a return address on to a stack to start forming a stack frame;
when pushing said return address, generating a checksum for said stack frame;
each time a predetermined opcode is detected for said subroutine, updating said checksum according to an operand associated with said predetermined opcode;
if the predetermined opcode is a pop opcode, in addition to said updating, determining whether the operand associated with said pop opcode is said return address;
if it is determined that said operand is said return address, verifying said checksum before executing said predetermined opcode in order to detect an attack.

9 Claims, 5 Drawing Sheets

(56) References Cited

U.S. PATENT DOCUMENTS

| | | | | |
|---|---|---|---|---|
| 2004/0168078 A1* | 8/2004 | Brodley | ................ | G06F 9/3806 |
| | | | | 726/22 |
| 2009/0328231 A1* | 12/2009 | Gonzalvo | ........... | G06F 9/45504 |
| | | | | 718/1 |
| 2019/0227953 A1* | 7/2019 | Trivedi | ............... | G06F 12/1483 |

OTHER PUBLICATIONS

Habibi Javid et al: "DisARM: Mitigating 1-11 Buffer Overflow Attacks on Embeddeci Devi ces", Nov. 6, 2015 (Nov. 6, 2015), Big Data Analytics in the Social and Ubiquitous Context : 5th International Workshop on Modeling Social Media, MSM 2014, 5th International Workshop on Mining Ubiquitous and Social Environments, Muse 2014 and First International Workshop on Machine LE, XP047328655, [ 18 pages].

Cari Burch: "ARM subroutines & program 1-11 stack", Oct. 1, 2012 (Oct. 1, 2012), XP055742024, Retrieved from the Internet: URL: http : //www. toves . org/books/armsub/ [retrieved on Oct. 20, 2020] the whoie document [5 pages ].

* cited by examiner

STACK PROTECTION

TECHNICAL FIELD

The present invention relates generally to stack protection, and more particularly to a method for protecting stack frames during execution of a program in a computer system.

BACKGROUND

It is known that when a program calls a subroutine, arguments, saved registers, local variables and a return address of the subroutine are pushed on to the stack (also called call stack, run-time stack, etc.) so that a stack frame is created on the stack. A stack frame corresponds to a call to a subroutine that has not yet terminated with a return. When the called subroutine calls a new subroutine, a new stack frame is created on the stack. FIG. 1 illustrates an example of a conventional stack of the prior art comprising three stack frames when a program 100 is executed. At first, program 100 calls a subroutine gamma having arguments a and b, a local variable i, and a subroutine beta. The arguments b and a, the return address (or link register, which is used to transfer the control back to the code that called the subroutine gamma), and the local variable i of the subroutine gamma are pushed on to the stack in the order of the direction of stack growth (In FIG. 1, the stack being downward growing, gamma is the earliest called subroutine). Thus, a stack frame comprising these parameters corresponding to the subroutine gamma is formed on the stack. When the subroutine gamma calls the subroutine beta, a stack frame corresponding to the subroutine beta is formed on the stack (with its return address back to the caller gamma). Similarly, when the function beta calls the function alpha, a stack frame of the function alpha is formed on the stack (with the return address back to the caller beta).

However, a fault injection on stack or a local buffer overflow can corrupt the above-mentioned parameters (e.g., method arguments, saved registers, local variables, and return addresses, etc.) in the stack frames. There are typically two type of attacks. A laser fault can corrupt method arguments on the stack, which enables an attacker to bypass some sensitive codes. A return address can be corrupted using stack smashing techniques which allows an attacker to execute his shell code.

SUMMARY

In order to solve the above mentioned technical problem, the present invention provides a solution to improve stack security to protect programs vulnerable to the attacks mentioned above: argument corruption and return address corruption.

In a particular embodiment of the present invention, there is a method for protecting a program in a computer system, the method comprising:
when a subroutine of the program is called, pushing a return address on to a stack to start forming a stack frame;
when pushing the return address, generating a checksum for the stack frame;
each time a predetermined opcode is detected for the subroutine, updating the checksum according to an operand associated with the predetermined opcode;
if the predetermined opcode is a pop opcode, in addition to the updating, determining whether the operand associated with the pop opcode is the return address;
if it is determined that the operand is the return address, verifying the checksum before executing the predetermined opcode in order to detect an attack.

In a particular embodiment of the present invention, wherein the predetermined opcode is any one chosen from a group comprising a push opcode, a load opcode, and a pop opcode.

In a particular embodiment of the present invention, wherein the method further comprises:
when generating the checksum, initializing the checksum to have a predetermined value and adding the return address's value to the predetermined value;
when updating the checksum:
if the predetermined opcode is a push opcode, adding the operand to the current value of the checksum;
if the predetermined opcode is a load opcode or a pop opcode, subtracting the operand from the current value of the checksum;
when verifying the checksum, checking whether the current value of the checksum is equal to the predetermined value:
if the checksum is equal to the predetermined value, it is determined that there is no attack; otherwise, it is determined that there is an attack.

In a particular embodiment of the present invention, wherein the method further comprises:
introducing a pointer pointing to the checksum;
each time a new subroutine is called, operating the pointer to point to a new checksum generated for a new stack frame corresponding to the new subroutine;
when it is to update or verify the checksum, updating or verifying the checksum the pointer points to; and
each time a subroutine is terminated with a return, operating the pointer to point to the checksum of the caller of the subroutine.

In a particular embodiment of the present invention, wherein the checksum is generated and stored in a Random Access Memory RAM.

In a particular embodiment of the present invention, wherein the pointer is introduced in a Central Processing Unit CPU's internal register.

In a particular embodiment of the present invention, wherein the method further comprises:
if the checksum verification result is negative, stopping execution of the program.

In a particular embodiment of the present invention, wherein the method further comprises:
creating new opcodes which extend the predetermined opcodes, the new opcodes comprising:
a new push opcode that extends a push opcode to generate the checksum and/or update the checksum;
a new load opcode that extends a load opcode to update the checksum;
a new pop opcode that extends a pop opcode to update the checksum and/or verify the checksum;
applying the new opcodes to the entire program or sensitive part of the program.

In a particular embodiment of the present invention, wherein the new push opcode further extend the push opcode to operate a pointer to point to the currently activate checksum, and wherein the new pop opcode further extends the pop opcode to operate a pointer to point to the currently activate checksum.

In a particular embodiment of the present invention, wherein the method further comprising: when detecting an opcode instructing to access data in a loop, loading the data from the stack only once, storing the data in a register, and accessing the data from the register in a loop.

In a particular embodiment of the present invention, there is a computer system, comprising;

a CPU configured to control operation of the computer system based on an operating system stored in a memory, wherein the CPU is further configured to push a return address on to a stack to start forming a stack frame when a subroutine of a program is called;

a checksum generation module configured to generate a checksum for the stack frame when the return address is pushed;

a checksum updating module configured to update the checksum according to an operand associated with a predetermined opcode each time the predetermined opcode is detected for the subroutine;

a checksum verification module configured to, if the predetermined opcode is a pop opcode, determine whether the operand associated with the pop opcode is the return address when the checksum updating module updates the checksum;

the checksum verification module being further configured to, if it is determined that said operand is the return address, verify said checksum, before the predetermined opcode is executed, in order to detect an attack.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

The advantages and features of the system according to the embodiments of the present invention are the same with those of the above described method and will not be repeated here.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this description, illustrate embodiments consistent with the invention and, together with the description, serve to explain the principles of the invention.

Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
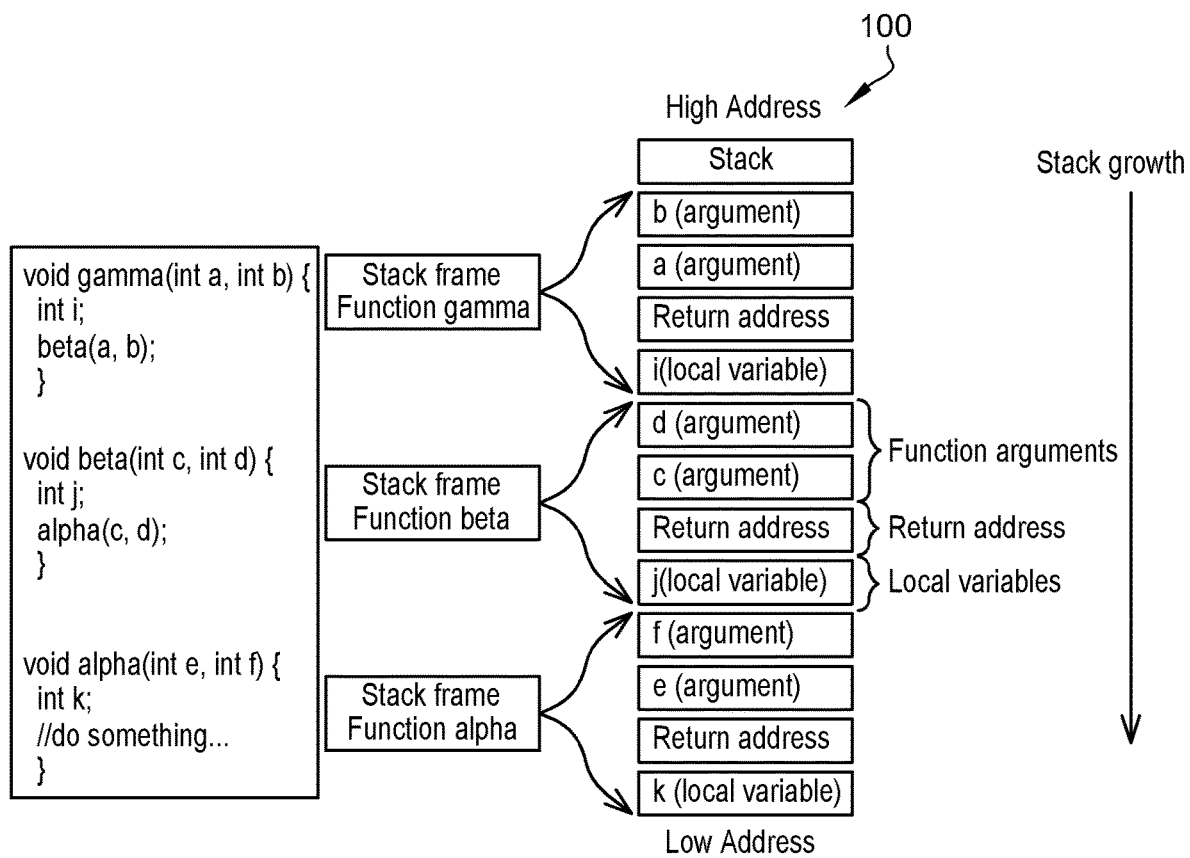
FIG. 1 illustrates an example of a conventional stack of the prior art comprising three stack frames when a program is executed.
Figure 2A:
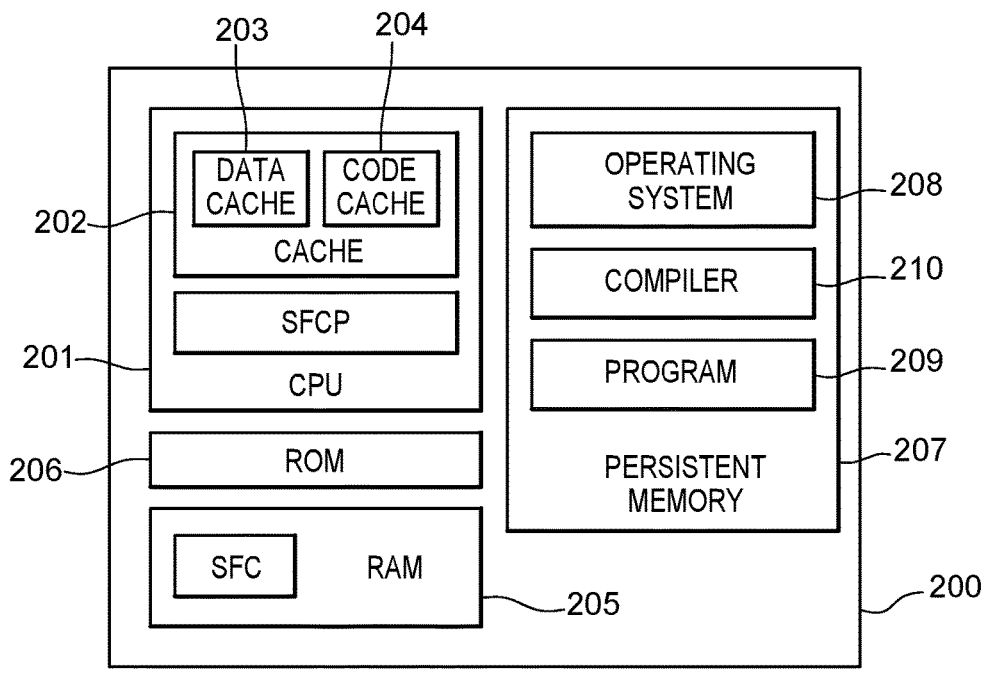
FIG. 2A-B illustrate a block diagram of a computer system according to an exemplary embodiment of the invention.
Figure 2B:
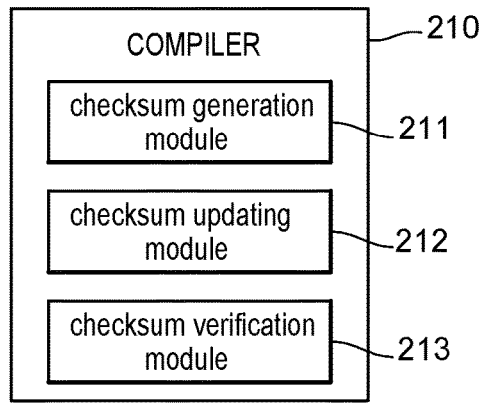

With reference to FIG. 2, a computer system may be adapted to protect against laser fault attacks and stack buffer overflow attacks by modifying the computer system, especially its CPU, to generate, operate, and verify stack frame checksums in order to detect whether data on the stack, such as arguments, saved registers, a return address value, and local variables, has been altered and, if so, to stop execution of the attacked program.

In one embodiment of the invention, a computer system 200 may include a CPU (or processor) 201 comprising a cache 202.

Cache 202 may include a code cache 203 and data cache 204 to store instructions that compiler 210 translates from program 209. Processor 201 uses the code cache 203 to store instructions (operation codes, or opcodes) prior to execution, based on the currently executing application program, and uses data cache 204 to store data arguments (operands) for each opcode, when applicable. Processor 201 may use instruction pipelining capabilities to fetch instructions (typically including an opcode and an operand) and store them in code cache 203.

Computer 200 may also include RAM 205 and ROM (Read-Only Memory) 206. In addition, computer 200 may store in memory 207 (e.g., a hard disk or other persistent storage) an operating system module 208 and program 209, and compiler 210. Compiler 210 translates program 209 into a list of instructions so that CPU 201 may process the instructions.

Compiler 210 further comprises software modules: checksum generation module 211, checksum updating module 212, and checksum verification module 213 which may be used to generate new instructions (e.g., PUSHC, POPC, LDRC) as described further below. Furthermore, CPU implements these new instructions in hardware layer (e.g., via CPU instruction execution module) to automatically operate SFC during program runtime, as described further below. Compiler 210 generates a list of instructions (e.g., by translating program 209's codes into instructions). The instructions are stored in cache 202 so that CPU 201 may fetch and execute the instructions in a sequence. Operating system module 208 controls the overall operation of the computer system, as is known in the art with respect to operating systems.

Checksum generation module 211 is adapted to generate a stack frame checksum (SFC) when a return address is placed on the stack (e.g., via a push opcode that pushes a link register on to the stack). In an embodiment, checksum generation module 211 may be adapted to operate a pointer (SFCP) (e.g., a pointer introduced in CPU 201's internal register 214) to point to the last generated checksum, e.g., by decrementing or incrementing the pointer according to the stack growth direction. Introducing SFCP in a CPU internal register allows to benefit from the legacy design of CPU Stack flow (e.g., stack pointer mechanism). Keeping SFCP within an internal register has another advantage that CPU can automatically increment/decrement SFCP whenever it is needed. Moving SFCP to another memory may cause a user to manage SFCP himself, which thus brings more chances of mistakes and also adds extra overhead of code size decreasing performance. But the invention is not limited to CPU internal register implementation. SFCP could of course be implemented in other memories than CPU internal register if needed.

Checksum updating module 212 is adapted to update the stack frame checksum when data (e.g., return address, arguments, saved registers, local variables, etc.) is sent on the stack or retrieved from the stack (e.g., via a push opcode (PUSH) that pushes data on to the stack, or a load opcode (LDR) that loads data from the stack, or a pop opcode (POP) that pops data off the stack).

Checksum verification module 213 is adapted to verify the stack frame checksum when CPU 201 detects that the return address is to be popped from the stack (e.g., via a pop opcode that pops the return address off the stack). In an embodiment, checksum verification module 213 may be adapted to operate the pointer to point to the currently activate checksum, e.g., by incrementing or decrementing the pointer according to the stack growth direction.

In an embodiment, modules 211, 212, and 213 may be used to implement or make up new opcodes or instructions comprising a new push opcode (PUSHC), a new load opcode (LDRC), and a new pop opcode (POPC) which extend the existing opcodes such as the push opcode (PUSH), load opcode (LDR), and the pop opcode (POP), respectively. Compiler 210 thus may translate program 209's codes into the new opcodes on a partial or entire basis. Consequently, CPU 201 may execute the new opcodes in order to protect a part of or the whole program 209. This will be further described below.

Alternatively, checksum generation module 211, checksum updating module 212, and checksum verification module 213 may be incorporated in operating system 208 so that the computer's operating system performs the checksum generation, updating, and verification services. Incorporating these modules into the operating system would efficiently enable debuggers to analyze core dumps. Vulnerable code 209 may be any software application or code component that is vulnerable to laser fault attacks and buffer overflow attacks as described above.

One of skill in the art will appreciate that other types of computer systems may be adapted to perform according to the invention. For example, computer system 200 may alternatively be a mobile telephone (or other mobile terminal), a personal digital assistant, an APPLE® computer using a Motorola or other type processor, a reduced instruction set computer (RISC), or any other type of computer or data processing system. The systems and methods disclosed herein may benefit systems using both fixed-size (RISC-based systems) and variable-sized (CISC-based systems) instruction sets.

One of skill in the art will appreciate that the invention is also applicable for virtual machines specially Java Virtual Machine (or JVM) and Java Card Virtual Machine (or JCVM) where the invention may protect java stack in the same way with small software overhead.

Figure 3:
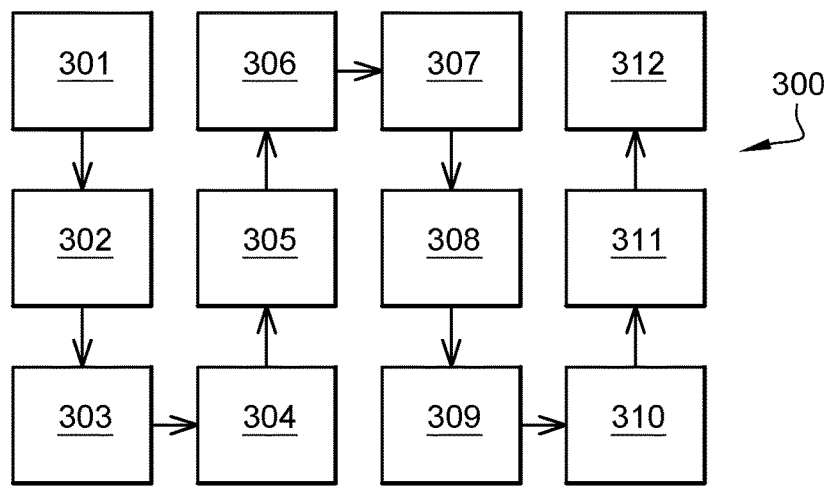
FIG. 3 illustrates a method for protecting a program in a computer system according to an exemplary embodiment of the invention.

With further reference to FIG. 3, the invention provide a method for protecting a vulnerable code (or program) 209 against laser fault attacks and stack overflow attacks. Initially, either a user or an automated process (e.g., another program) instructs computer system 200 (specifically, processor 201) to run program 209. Upon being instructed to run the program, compiler 210 translates program 209 into a list of instructions. CPU 201 begins to fetch the instructions in a sequence, stores the fetched instruction in code cache 203, and stores the fetched data in data cache 204. CPU 201 executes the fetched instruction.

In step 301, a subroutine gamma is firstly called in program 209, CPU 201 fetches a push opcode that is to push a return address on to the stack. In this document, compiler 210 needs to make sure that the return address is the first register (e.g., a link register) pushed on to the stack by gamma to start forming a stack frame for gamma. This will let processor 201 know when it shall start generating a stack frame checksum SFC1 for gamma, as further described below. Consequently, the return address shall be the last register popped from the stack. This will let processor 201 know when it shall verify the stack frame checksum SFC1, as further described below. These small restrictions are implemented at compiler level. Thus, they shall not add any extra overhead in terms of performance. It is just to reorder the way registers are pushed to the stack and accessed from the stack.

In step 302, checksum generation module 211 instructs CPU 201 to generate a checksum SFC1 for the stack frame of gamma when the return address is pushed on to the stack by CPU 201. It should be noted that the generation may be performed before, at the same time, or after the execution of the push opcode pushing the return address. Checksum generation module 211 may instruct CPU 201 to store checksum SFC1 in a reserved area called SFC area, which is separated from the stack area, in RAM 205 for example. The required size of the SFC area may be very small and depends on maximum function call depth in the code 209. The call depth may be computed by the compiler of computer system 200 and the SFC area may be reserved accordingly.

In step 303, when generating the checksum SFC1, checksum generation module 211 may instruct CPU 201 to initialize the checksum SFC1 to have a predetermined value, e.g., zero or any other values, and checksum updating module 212 may instruct CPU 201 to update the checksum SFC1's value to a sum of the predetermined value "0" and the return address's value as the return address has just been pushed on to the stack. Thus, the current value of SFC1 is the return address.

CPU 201 fetches a next opcode and detects whether it is a predetermined opcode. Preferably, the predetermined opcode may comprise a push opcode, a load opcode, and a pop opcode. As these opcodes modify data on the stack, the detection of these opcodes may allow preventing malicious modification of the data, e.g., argument corruption and return address corruption.

For example, we assume that CPU 201 detects, in step 304, a push opcode that is to push X on to the stack. Checksum updating module 212 instructs CPU 201 to update the checksum SFC1 according to the operand (i.e., X) associated with the detected push opcode. Checksum updating module 212 may instruct CPU 201 to add, in step 305, the operand to the current value, i.e., the return address, of the checksum SFC1. Therefore, after the updating, the current value of SFC1 becomes a sum of return address and X. It should be noted that the updating may be performed before, at the same time, or after the execution of the push opcode.

Still for example, we assume that CPU 201 fetches a next opcode which is a load opcode that is to load X from the stack. Checksum updating module 212 instructs CPU 201 to update the checksum SFC1 according to the operand (i.e., X) associated with the detected load opcode. Checksum updating module 212 may instruct CPU 201 to subtract, in step 306, the operand from the current value, i.e., return address+ X, of the checksum SFC1. Therefore, after the updating, the current value of SFC1 becomes the return address (=return address+X−X). It should be noted that the updating may be performed before, at the same time, or after the execution of the load opcode.

Still for example, we assume that CPU 201 fetches a next opcode which is a pop opcode that is to pop data from the stack. It is detected that the data to be popped is the return address, in step 307. Checksum updating module 212 instructs CPU 201 to update the checksum SFC1 according to the operand (i.e., return address). Checksum updating module 212 may instruct CPU 201 to subtract, in step 308, the operand from the current value, i.e., return address, of the checksum SFC1. Therefore, after the updating, the current value of SFC1 becomes 0 (=return address−return address). Checksum verification module 212 instructs CPU 201 to verify, in step 309, the checksum SFC1 to determine if there is an attack. Checksum verification module 212 may instruct CPU 201 to check, in step 310 the value of SFC1 is equal to the predetermined value "0". Therefore, checksum verification module 212 instruct CPU 201 to determine (311) that there is no attack. Otherwise, it will determine that an attack is happening. In this situation, processor 201 may stop, in step 312, the execution of program 209 or adopt any other appropriate evasive actions. In order to prevent a malicious altering of the return address, the updating and the verification shall be performed before the execution of the pop opcode associated with the return address, while the updating and the verification may be performed before, at the same time, or after the execution of the pop opcode associated with data other than the return address.

In an embodiment, CPU 201 may introduce a pointer SFCP pointing to the checksum SFC1. This pointer SFCP may initially point to the top of the SFC area. Checksum generation module 211 may be adapted to operate the pointer SFCP to point to the last generated checksum. For example, when gamma's checksum SFC1 is generated, checksum generation module 211 may decrement pointer SFCP to make it point to checksum SFC1. When gamma calls a new subroutine beta and thus beta's checksum SFC2 is generated, checksum generation module 211 may decrement pointer SFCP to point to checksum SFC2. When beta calls a new subroutine alpha and thus alpha's checksum SFC3 is generated, checksum generation module 211 may decrement pointer SFCP to point to checksum SFC3.

It should be noted that, whether to decrement or increment pointer SFCP depends on the stack growth direction (e.g., from high address to low address, or from low address to high address) as known in the art. The invention is not limited to a particular direction for pointer operation. Since most programs have more than one functions or subroutines, such a pointer SFCP allows to maintain a checksum SFC for an entire call depth/tree of each function and protect the entire stack when there are multiple stack frames on the stack. This means, when it is to update or verify the checksum (e.g., SFC1, SFC2, SFC3), it is to always update or verify checksum pointer SFCP points to. It is noted that only when a return address is pushed to or popped from the stack, checksum pointer SFCP will move to point to a next checksum or a previous checksum.

Correspondingly, when the subroutine (e.g., alpha) is terminated with a return (e.g., via a pop opcode that instruct to retrieve the corresponding return address from the stack), after updating module 212 updates the checksum that pointer SFCP points to (e.g., SFC3), checksum verification module 213 may verify SFC3 to check if there are any attacks, and increment pointer SFCP to point to the checksum (e.g., SFC2) of the caller (e.g., beta) of the subroutine which has just terminated (e.g., alpha). Thus, pointer SFCP is always pointing to the currently activate checksum.

It should be noted that, whether to decrement or increment pointer SFCP depends on the stack growth direction (e.g., from high address to low address, or from low address to high address) as known in the art. The invention is not limited to a particular direction for pointer operation.

Since most programs have more than one functions or subroutines, such a pointer SFCP allows to maintain a checksum SFC for an entire call depth/tree of each function and protect the entire stack when there are multiple stack frames on the stack.

Figure 4:
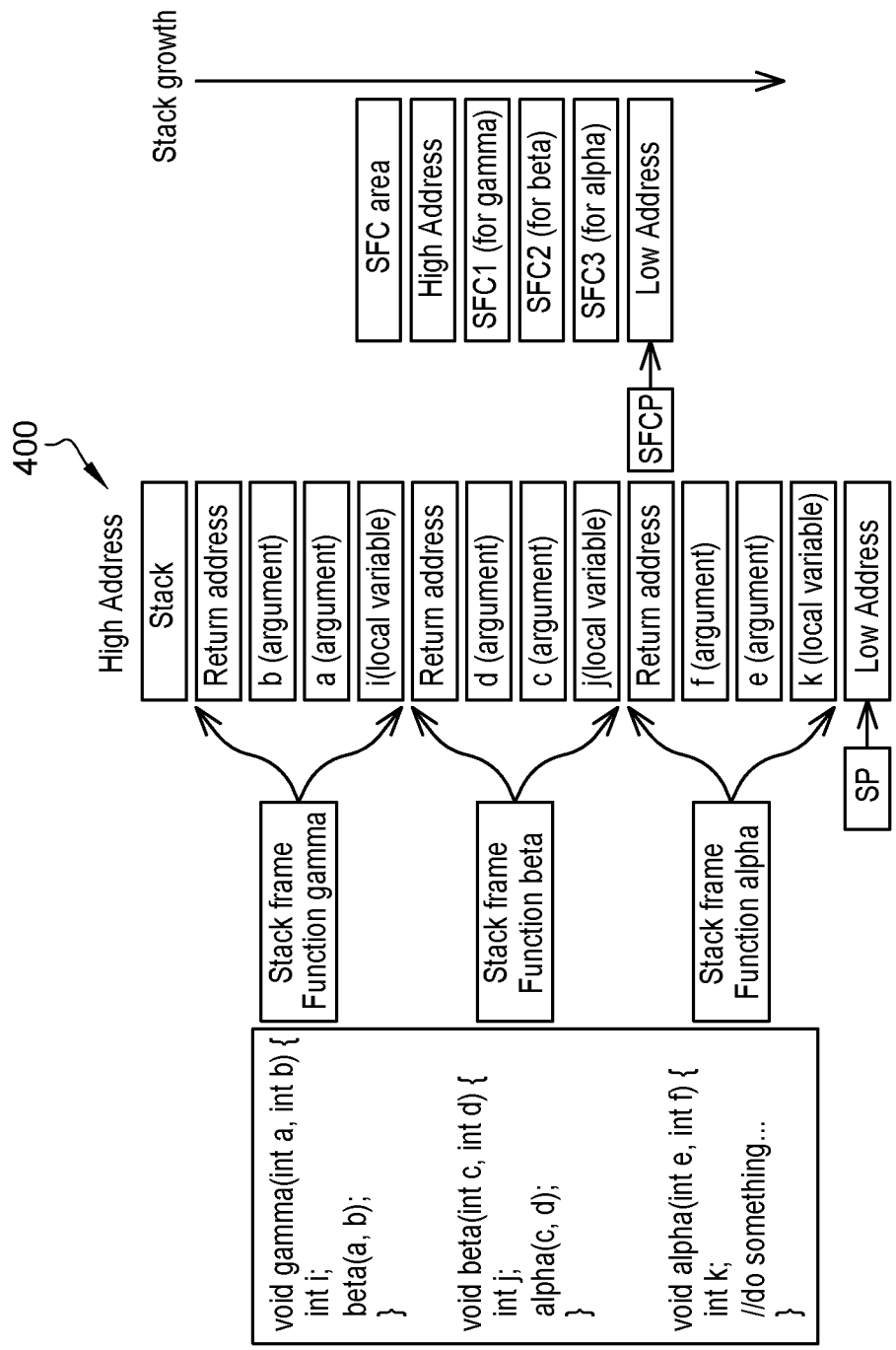
FIG. 4 illustrates a stack area and a stack frame checksum area in accordance with an exemplary embodiment of the invention.

Now referring to FIG. 4, we can see an example of a stack with a SFC area. The stack 400 comprises three stack frames for functions gamma, beta, and alpha respectively. Each stack frame starts from the return address of the corresponding function. The SFC area may be a separated area from the stack area 400 in RAM 205. The SFC area stores three stack frame checksums, SFC1 for function gamma, SFC2 for function beta, and SFC3 for function alpha. The stack frame checksum pointer SFCP is now pointing to the address immediately below SFC3. We may say that SFCP is now pointing to SFC3. In other words, alpha is the currently activate function (i.e., not yet terminated with a return). So, currently if it is necessary to update or verify the checksum, SFC3 is the one that needs to be updated or verified. Pointer SP is a pointer that points to the next immediately available address in the stack, which is known in the art and will not be explained herein.

As mentioned before, the software modules checksum generation module 211, checksum updating module 212, and checksum verification module 213, may be used to implement new opcodes PUSHC, LDRC, and POPC according to their usage as explained in the following Table 1.

TABLE 1

Stack Frame Checksum (SFC) Usage/Instructions

| Legacy Instruction | Usage | New Instruction | Extended Usage |
| --- | --- | --- | --- |
| PUSH | Pushes registers to the stack and operates (e.g., decrements, increments) stack pointer SP | PUSHC | Same purpose as PUSH + generates SFC (operates (e.g., decrements, increments) SFCP when a link register is pushed) |
| LDR | Loads data from memory/stack to registers | LDRC | Loads data from memory/stack to registers + updates SFC (does NOT operate SFCP) that SFCP points to |
| POP | Pops the data from stack to registers and operates (e.g., increments, decrements) stack pointer SP | POPC | Same purpose as POP + updates SFC+ verifies SFC + (operates (e.g., decrements, increments) SFCP only when a link register is popped) |

By implementing the above extended instructions PUSHC, LDRC, and POPC, it allows processor 201 to apply the new protection strategy of the invention on any programs vulnerable to laser fault attacks and stack overflow attacks without modifying the programs. Data like method arguments is protected from corruption with the combination of PUSHC and LDRC. For data on each address on the stack, LDRC shall be used once per PUSHC as LDRC will update SFC ever time. The compiler shall simply load arguments from the stack to registers using LDRC once, and then use these registers if they are accessed in a loop. Actually, in legacy compilers, LDR instruction may instruct CPU 201 to retrieve same data from the stack several times in a loop (i.e., a method argument was pushed on stack once but it may be accessed from the stack many times by the called function). The invention enables to protect method arguments/local variables by updating SFC with the new LDRC instruction. It should be noted that the compiler shall be modified to treat the case wherein compiler translates a code of program 209 that accesses data in a loop into the LDRC instruction. In order to avoid updating SFC for the same data again and again (due to the loop) and thus creating inconsistent SFC, the compiler is modified to, when receiving the LDRC instruction, instruct CPU 201 to load the data from the stack only once, store the data in a general purpose register, and access the data from this general purpose register in a loop. Thus, even if program 209 requires accessing the same data in a loop, the SFC will be updated only once to keep the checksum value correct. Further, data like return addresses is protected from corruption with POPC.

Figure 5:
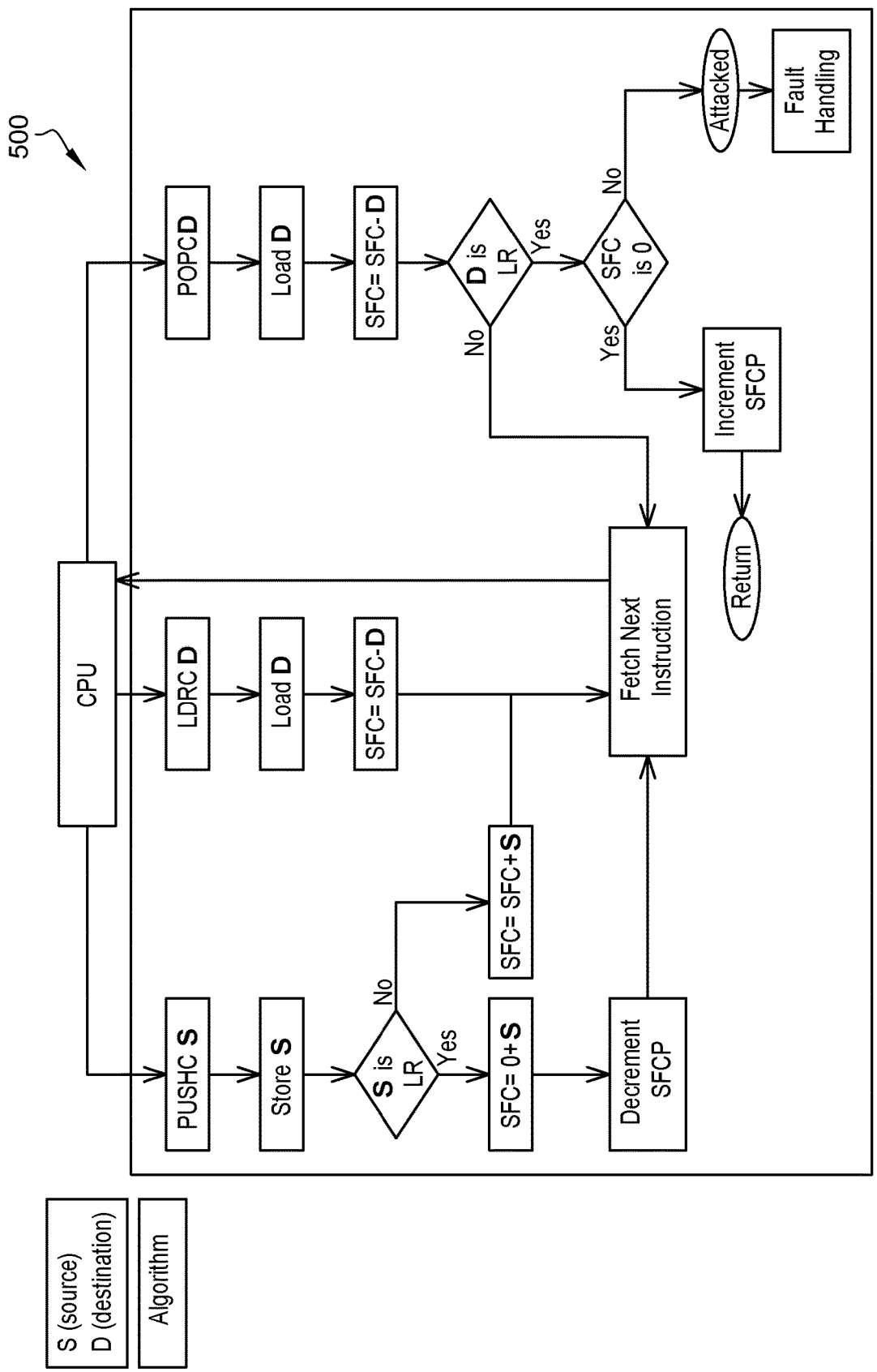
FIG. 5 illustrates a flowchart of a method for protecting a program in a computer system with new instructions in accordance with an exemplary embodiment of the invention.
Figure 6:
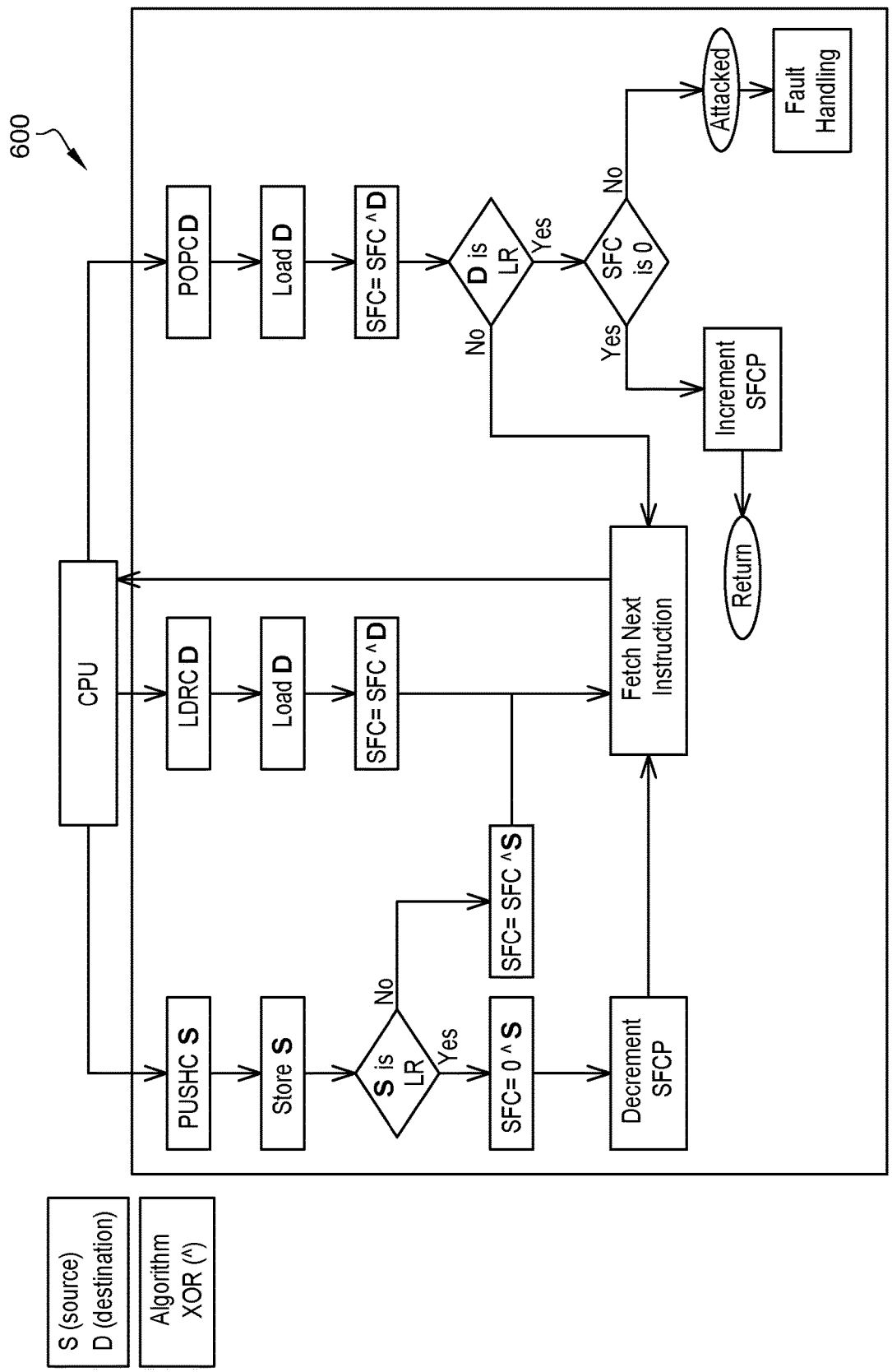
FIG. 6 illustrates a flowchart of a method for protecting a program in a computer system with new instructions in accordance with another exemplary embodiment of the invention.

FIG. 5 shows an exemplary process flow 500 followed by CPU 201 which implements the new instructions (or opcodes) PUSHC, LDRC, and POPC listed in Table 1 when program 209 is executed. S designates data (e.g., method arguments, saved registers, return address, local variables, etc.) to be placed on the stack. D designates data to be retrieved from the stack. LR designates a link register (return address). Compiler 210 may be configured to translate codes of program 209 into a PUSHC, a LDRC, or a POPC. Processor (i.e., CPU) 201 then performs the new instructions accordingly. In this example, the checksum SFC is initialized to be 0, and the updating of SFC is realized with additions and subtractions between the current value of SFC and the data operated by the instructions, as described above. The invention is not limited to this implementation, however. One skilled person in the art would make various modifications based on the inventions principle idea. For example, XOR operation may be used in an alternative embodiment, as shown in FIG. 6.

The invention improves CPU's stack security by solving both: method argument corruption attack, and return address corruption using stack smashing attack.

The invention may be applied to any CPU architecture (ARM CPU, x86 CPU, or other CPUs). It may also be implemented in virtual machines specially JVM and JCVM where java stack can be protected in the same way with small software overhead.

With the invention, the legacy architecture of CPU does not need to be changed. The features of the invention may be implemented as an add-on to the existing CPU.

Legacy software (i.e., assembly code) does not need to be changed. Introduction of the new instructions (PUSHC, LDRC, POPC) allow a user to target only sensitive functions or to the entire code.

The invention may thus be considered as the fastest and efficient way to protect the runtime stack.

An area in RAM is needed for saving SFC, but the required size of this area is very small and depends on maximum function call depth in the code. The call depth can be computed by compiler and SFC area can be reserved accordingly.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for protecting a program in a computer system, the method comprising:
   when a subroutine of said program is called, pushing a return address on to a stack to start forming a stack frame;
   when pushing said return address, generating a checksum for said stack frame;
   each time a predetermined opcode is detected for said subroutine, updating said checksum according to an operand associated with said predetermined opcode;
   if the predetermined opcode is a pop opcode, in addition to said updating, determining whether the operand associated with said pop opcode is said return address;
   if it is determined that said operand is said return address, verifying said checksum before executing said predetermined opcode in order to detect an attack;
   when generating said checksum, initializing said checksum to have a predetermined value and adding said return address's value to said predetermined value;
   when updating said checksum;
      if said predetermined opcode is a push opcode, adding said operand to the current value of said checksum;
      if said predetermined opcode is a load opcode or a pop opcode, subtracting said operand from the current value of said checksum;
   when verifying said checksum, checking whether the current value of said checksum is equal to said predetermined value; and
   if said checksum is equal to said predetermined value, determining that there is no attack; otherwise, determining that there is an attack.

2. The method according to claim 1, wherein said predetermined opcode is any one chosen from a group comprising a push opcode, a load opcode, and a pop opcode.

3. The method according to claim 1, wherein the method further comprises:
   introducing a pointer pointing to said checksum;
   each time a new subroutine is called, operating said pointer to point to a new checksum generated for a new stack frame corresponding to said new subroutine;
   when it is to update or verify the checksum, updating or verifying the checksum said pointer points to; and
   each time after verifying the checksum, operating said pointer to point to the checksum of the stack frame of the caller of the subroutine.

4. The method according to claim 1, wherein said checksum is generated and stored in a Random Access Memory RAM.

5. The method according to claim 1, wherein said pointer is introduced in a Central Processing Unit CPU's internal register.

6. The method according to claim 1, wherein the method further comprises:
if the checksum verification result is negative, stopping execution of said program.

7. A method for protecting a program in a computer system, the method comprising:
when a subroutine of said program is called, pushing a return address on to a stack to start forming a stack frame;
when pushing said return address, generating a checksum for said stack frame;
each time a predetermined opcode is detected for said subroutine, updating said checksum according to an operand associated with said predetermined opcode;
if the predetermined opcode is a pop opcode, in addition to said updating, determining whether the operand associated with said pop opcode is said return address;
if it is determined that said operand is said return address, verifying said checksum before executing said predetermined opcode in order to detect an attack;
creating new opcodes which extend said predetermined opcodes, the new opcodes comprising:
a new push opcode that extends a push opcode to generate the checksum and/or update the checksum;
a new load opcode that extends a load opcode to update the checksum;
a new pop opcode that extends a pop opcode to update the checksum and/or verify the checksum; and
applying the new opcodes to the entire program or sensitive part of said program.

8. The method according to claim 7, wherein the new push opcode further extend the push opcode to operate a pointer to point to the currently activate checksum, and wherein the new pop opcode further extends the pop opcode to operate a pointer to point to the currently activate checksum.

9. A method for protecting a program in a computer system, the method comprising:
when a subroutine of said program is called, pushing a return address on to a stack to start forming a stack frame;
when pushing said return address, generating a checksum for said stack frame;
each time a predetermined opcode is detected for said subroutine, updating said checksum according to an operand associated with said predetermined opcode;
if the predetermined opcode is a pop opcode, in addition to said updating, determining whether the operand associated with said pop opcode is said return address;
if it is determined that said operand is said return address, verifying said checksum before executing said predetermined opcode in order to detect an attack; and
when detecting an opcode instructing to access data in a loop, loading the data from the stack only once, storing the data in a register, and accessing the data from the register in a loop.

* * * * *